Feb. 16, 1960   H. R. SHILLINGTON   2,925,553
ELECTRICAL TEST SETS
Filed July 22, 1955   3 Sheets-Sheet 1
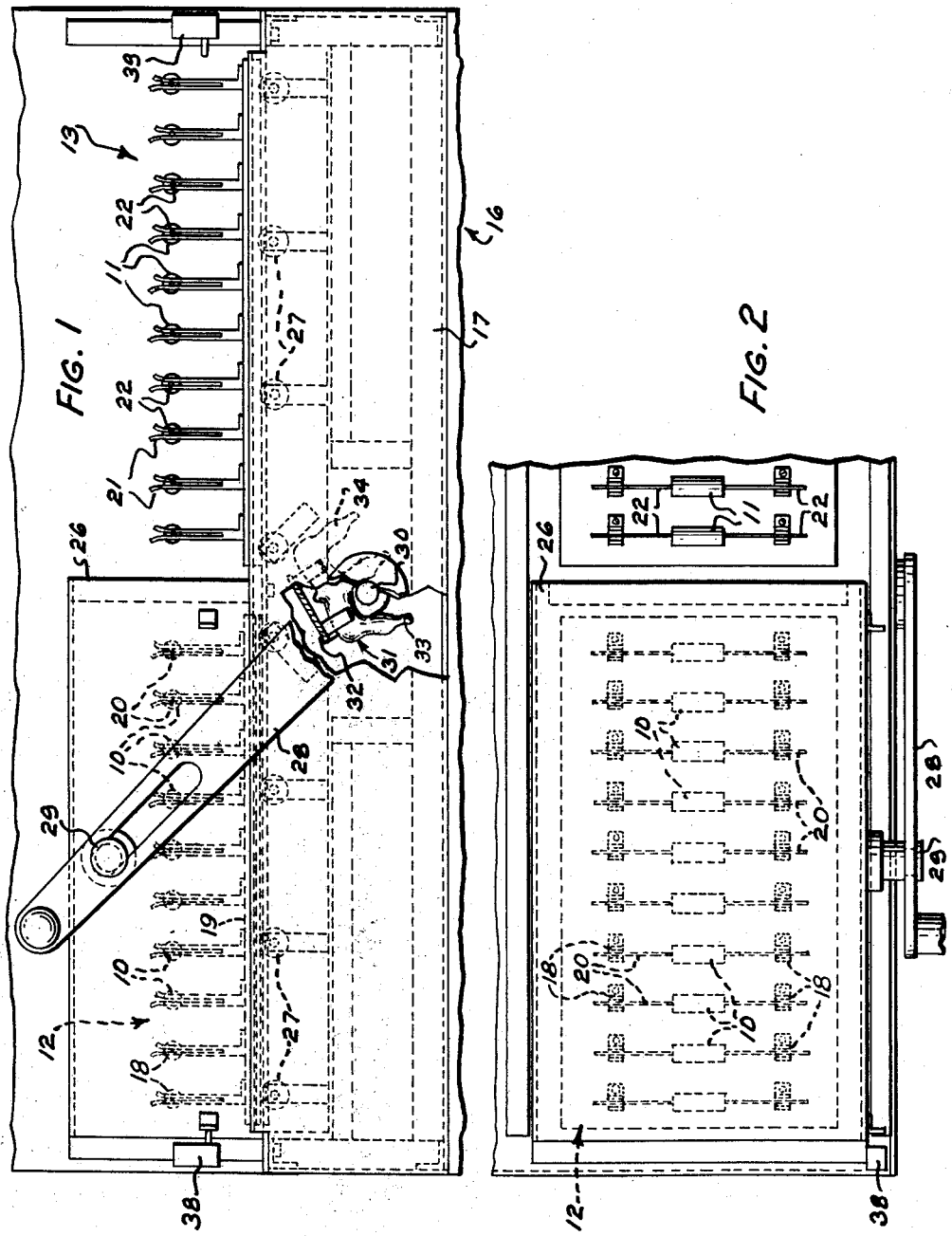
INVENTOR
H.R. SHILLINGTON
BY C.B. Hamilton
ATTORNEY

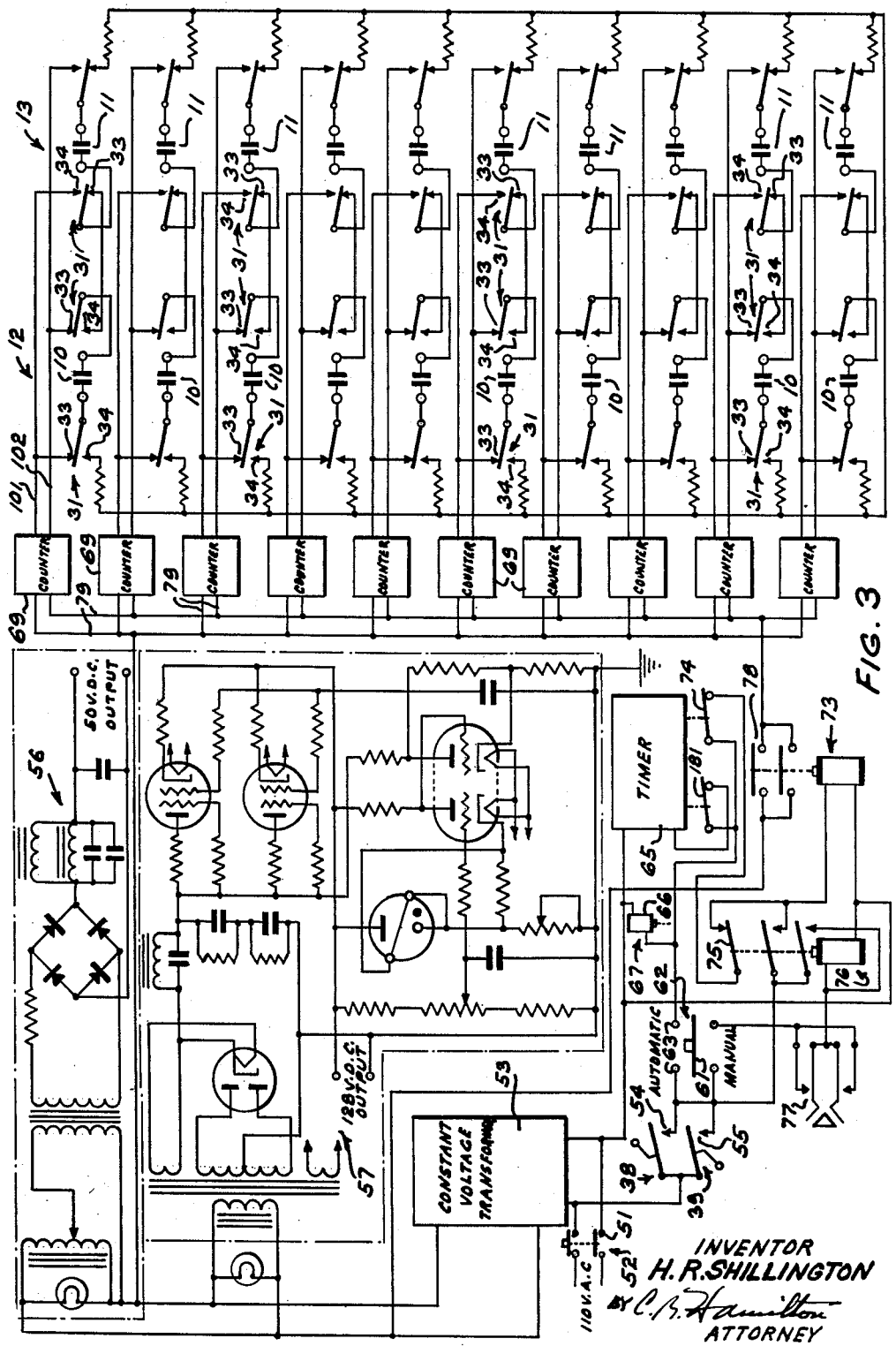

INVENTOR
H. R. SHILLINGTON
BY C. B. Hamilton
ATTORNEY

United States Patent Office 2,925,553
Patented Feb. 16, 1960

2,925,553
ELECTRICAL TEST SETS

Harry R. Shillington, Glen Ellyn, Ill., assignor to Western Electric Company, Incorporated, New York, N.Y., a corporation of New York Application July 22, 1955, Serial No. 523,882

5 Claims. (Cl. 324—54)

This invention relates to electrical test sets, and more particularly to metallized paper capacitor breakdown counting devices.

The purpose of this test set is to ascertain that in testing metallized paper capacitors, the capacitors sometimes are subjected to a D.C. test voltage for a predetermined interval of time, and according to prescribed standards, each capacitor should not have greater than a predetermined number of breakdowns. It is desirable to test several capacitors simultaneously and to precisely count and indicate the breakdowns of each capacitor.

An object of the invention is to provide new and improved electrical test sets for simultaneously testing a plurality of capacitors and counting the number of breakdowns of each capacitor.

Another object of the invention is to provide test sets having two groups of testing contacts each of which may be loaded while capacitors at the other group are being tested.

A further object of the invention is to provide simple and inexpensive counting devices for counting and indicating capacitor breakdowns.

In a test set illustrating certain features of the invention, a capacitor is subjected at a testing station to a breakdown voltage for a predetermined period of time and the number of breakdowns occurring is counted and indicated. If desired, an alternate testing station may be provided which may be loaded while a capacitor is tested at the first test station and a guard may be moved to positions covering the stations and may automatically actuate the test set.

A complete understanding of the invention may be obtained from the following detailed description of a test set forming a specific embodiment thereof, when read in conjunction with the appended drawings, in which—

Fig. 1 is a front elevation of a test set forming one embodiment of the invention;

Fig. 2 is a top plan view of the set shown in Fig. 1;

Fig. 3 is a diagrammatic view of a test circuit of the set shown in Fig. 1, and

Figure 4:
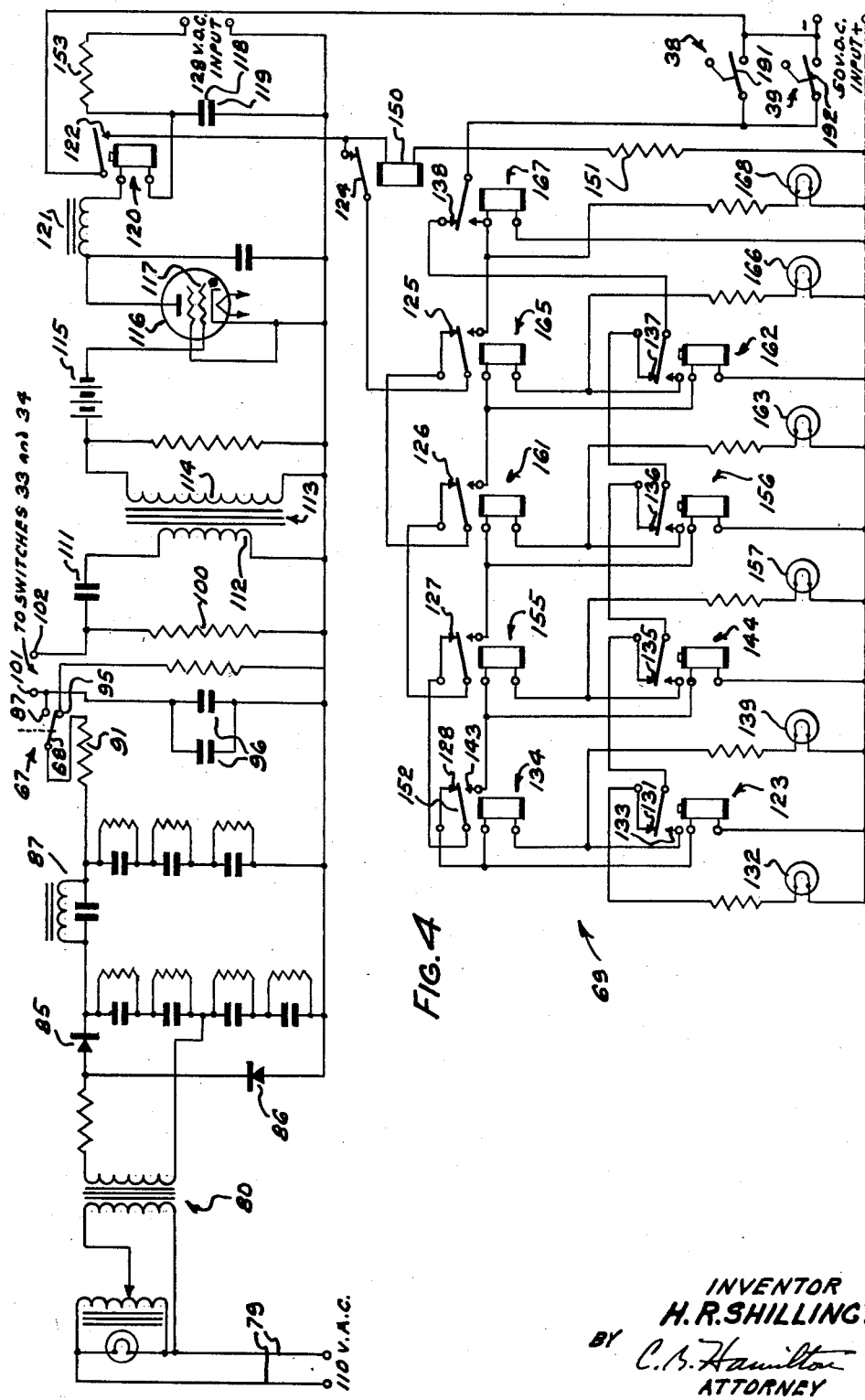
Fig. 4 is a diagrammatic view of a portion of the circuit shown in Fig. 3.

Referring now in detail to the drawings, there is shown therein a test set for counting and indicating breakdowns individually of metallized paper capacitors 10 at a station 12 while capacitors 11 are being loaded at a second station 13, after which the capacitors 10 are removed and the first station reloaded while the capacitors 11 are being tested. The test set includes a cabinet 16 from the front of which a housing 17 projects. Clips 18 are mounted on a top 19 of the housing at the station 12 and hold and electrically contact leads 20 of the capacitors 10. Similarly, clips 21 are provided at the station 13 for engaging leads 22 of the capacitors 11.

A channel-like protective cover or guard 26 is slidable, along rollers 27 forming a trackway, by a hand lever 28 through a pin-and-slot connection 29. The lever may be swung to place the cover in a position covering the station 12 or in a position covering the station 13. When the cover is over the station 12, mercury switches 31, which are clipped to a plate 32 fixed to a shaft 30, are in positions closing contacts 33, and contacts 34 thereof are open. When the cover is over the station 13, the contacts 33 are open and the contacts 34 are closed. Also, when the cover 26 is correctly positioned over the station 12, it closes a limit switch 38, while when over the station 13 it closes a limit switch 39. The switch 38 starts the test set to test the capacitors 10 while the switch 39 starts the test set to test the capacitors 11.

To test the capacitors 10, the cover or guard 26 covering them closes the contacts 33 and opens the contacts 34, a manual switch 51 (Fig. 3) in a power line 52 is closed to supply power to a constant voltage transformer 53, and contacts 54 and 55 of the limit switches 38 and 39, respectively. The transformer 53 supplies power to power supply circuits 56 and 57. The switch 38 is closed, and assuming that a contactor 61 of a manually operable switch 62 is set in "automatic" in engagement with contacts 63, power is supplied to a timer 65 of a well known type and a relay winding 66 of a relay 67 having sets of contacts 68 in counters 69. This energizes a relay 73 through contacts 74 of the timer 65 and contacts 75 of a relay 76 associated with a key 77 for use in manual starting. The relay 73 closes contacts 78 to supply power from the transformer 53 to input conductors 79 of the counters 69 to supply power to transformers 80 (Fig. 4) of the counters. Each transformer 80 supplies power to rectifiers 85 and 86, and a filter section 87 and a transient surge-limiting resistor 91.

The relay 67 moves the contactor 68 from a contact 95 shorting capacitors 96 into engagement with a contact 97 connecting the capacitors 96 to the filter section 87, and the capacitors 96 are brought to testing voltage. The capacitors 96 are connected directly to the capacitors 10 through a current-limiting resistor 100 and conductors 101 and 102 and the switches 33 to apply the full voltage thereacross to the capacitors 10.

Whenever the capacitor 10 charges up to a voltage at which it breaks down, it sends a surge of current through a capacitor 111 and a primary winding 112 of a step-up transformer 113. This induces a voltage in a secondary winding 114 sufficient to overcome the bias of a battery 115 and triggers a thyratron tube 116 through a control grid 117. A capacitor 118 then discharges through a relay 120 and a choke coil 121 and the thyratron to close contacts 122. This energizes a counting relay 123 and a set-up relay 134 through contacts 124, 125, 126, 127 and 128, and the relay 123 opens contacts 131 to extinguish an indicating lamp 132 and close contacts 133 to bring in the relay 134 through a circuit including contacts 133, 135, 136, 137 and 138. The closing of contacts 133 also lights an indicating lamp 139, which indicates that one breakdown has occurred. Energization of the relay 134 opens contacts 128 and closes contacts 143 to set up a circuit to a counting relay 144.

After the relay 120 has brought in the relay 123, a relay 150 delayed by a resistor 151 is energized to break the circuit to a contactor 152 of the relay 134 before the relay 134 sets up the circuit to the relay 144. When the surge of current from the capacitor 118 dies down due to slowed charging thereof through a resistor 153, the tube 116 no longer has a sustaining plate voltage and becomes non-conductive again to drop out the relay 120. Then, as the capacitors 10 again charge up to peak voltage, the capacitor 118 recharging also, if there is still a potential breakdown point in the capacitor 10, the capacitor 10 breaks down to again make the tube 116 conductive and the relays 120 and 144 are energized. The relay 144 energizes a set up relay 155 to set up a circuit to a counting relay 156, lights a lamp 157, and extinguishes the lamp 139.

If a third breakdown of the capacitor 10 occurs, the relay 156 is energized to bring in a set up relay 161 to set up an energizing circuit to a counting relay 162 and energize a lamp 163. Similarly if a fourth breakdown occurs, the relay 162 is energized to energize a set-up relay 165 and an indicating lamp 166, and, if a fifth breakdown occurs, a counting and holding relay 167 is energized, locks itself in and energizes a lamp 168 to indicate that the capacitor 10 is unsatisfactory. The relays 120, 123, 134, 144, 155, 156, 161, 162, 165 and 167 are fast acting, single pole, double throw, mercury contact relays of a commercially available type.

After the lapse of a predetermined period of time after the start of the test of the capacitors 10, sufficient for at least five breakdowns in each capacitor 10 to occur if that capacitor is defective, the timer 65 (Fig. 3) times out to open contacts 74 and 181 of the timer to stop the timer and drop out the relay 73 to cut off power to the test power supply transformers 80 (Fig. 4) of the counters 69. Then the operator moves the guard 26 from the station 12 to the station 13 to start testing the capacitors 11, unload the capacitors 10 and reload the capacitors 10. As the guard 26 leaves the station 12, the switch 38 opens its contacts 54 and 191, and, the switch 39 being unactuated until the guard 26 completely covers the station 13, contacts 55 and 192 of the switch 39 are open. Thus, both the contacts 54 and 55 are momentarily open to reset the timer 65, and both the contacts 191 and 192 of each counter 69 are momentarily open to reset the counter by dropping out all the relays thereof. Then, when the guard 26 covers the station 13 completely, the switch 39 is closed to start the test of the capacitors 11 through the contacts 55 and set up the holding circuit for the lower relays of the counters 69 through the contacts 192.

The above-described test set serves to test a large number of capacitors at once, the results of tests on each capacitor being shown by one of the counters 69, and permits one of the stations 12 and 13 to be unloaded and reloaded while capacitors at the other station are being tested.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A test set, which comprises chargeable means for applying repeatedly a breakdown voltage to a self-healing capacitor, a counter operable up to a predetermined number, amplifying means responsive to each breakdown of the capacitor for actuating the counter, holding means responsive to operation of the counter for holding it in actuated condition, and guard means for covering the capacitor operable when moved away from the capacitor to render the holding means ineffective.

2. A test set, which comprises a first group of capacitor-connecting-and-holding clips, a second group of capacitor-connecting-and-holding clips, a U-shaped cover for selectively covering one of said groups, a trackway along which the cover moves from one group of clips to the other group of clips, a circuit for repeatedly testing a plurality of capacitors individually for breakdown and counting the number of breakdowns individual to each capacitor, means operable by the cover for connecting the circuit to the group of clips over which the cover is positioned, and means actuatable by the cover as it is moved from one of said groups to the other for resetting the circuit.

3. A test set, which comprises a first group of capacitor-connecting-and-holding means, a second group of capacitor-connecting-and-holding means, a cover for selectively covering one of said groups, guide means along which the cover moves from one group to the other group, an electrically resettable circuit for repeatedly testing a plurality of capacitors individually for breakdown and counting the number of breakdowns individual to each capacitor, means operable by the cover for connecting the circuit to the group of capacitor-connecting-and-holding means over which the cover is positioned, and means actuatable by the cover as it is moved from one of said groups to the other for resetting the circuit.

4. In an apparatus for testing capacitors, a first test station having facilities for holding a first group of capacitors, a second test station having facilities for holding a second group of capacitors, a test circuit including switches at each station for connecting each group of capacitors to the test circuit, means for supplying power to said test circuit, switches at each station for connecting power to said circuit, and means movable from one station to the other for simultaneously operating the switches thereat.

5. In an apparatus for testing capacitors, a first test station for holding a capacitor, a second test station for holding a capacitor, a test circuit adapted to apply breakdown voltage to a capacitor, a switch at the first station for connecting the test circuit to the capacitor thereat, a switch at the second station for connecting the test circuit to the capacitor, means movable between said stations for selectively operating the switches to connect the capacitor thereat to the test circuit, a successively operable multi-stage counter in said test circuit for registering each breakdown of the capacitor connected in the test circuit, and means operated by movable means moving from a station to reset the counter.

References Cited in the file of this patent

UNITED STATES PATENTS

| | | |
|---|---|---|
| 2,376,162 | Merriman | May 15, 1945 |
| 2,505,422 | Michaels | Apr. 25, 1950 |
| 2,522,151 | Weeks | Sept. 12, 1950 |
| 2,744,236 | Scarborough | May 1, 1956 |
| 2,789,267 | Beal et al. | Apr. 16, 1957 |
| 2,809,350 | Smith | Oct. 8, 1957 |